(12) United States Patent
Liebold

(10) Patent No.: US 11,371,759 B2
(45) Date of Patent: Jun. 28, 2022

(54) VALVE COMPRISING A DUAL PISTON ASSEMBLY AND METHOD OF FORMING A VALVE

(71) Applicant: Parker-Hannifin Corporation, Cleveland, OH (US)

(72) Inventor: Steven E. Liebold, Bartlett, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 26 days.

(21) Appl. No.: 16/981,765

(22) PCT Filed: Dec. 19, 2018

(86) PCT No.: PCT/US2018/066453
§ 371 (c)(1),
(2) Date: Sep. 17, 2020

(87) PCT Pub. No.: WO2019/221785
PCT Pub. Date: Nov. 21, 2019

(65) Prior Publication Data
US 2021/0095904 A1    Apr. 1, 2021

Related U.S. Application Data

(60) Provisional application No. 62/672,183, filed on May 16, 2018.

(51) Int. Cl.
*F25B 41/22*    (2021.01)
*F25B 47/02*    (2006.01)
(Continued)

(52) U.S. Cl.
CPC .............. *F25B 47/02* (2013.01); *F16K 3/24* (2013.01); *F16K 3/32* (2013.01); *F25B 41/22* (2021.01);
(Continued)

(58) Field of Classification Search
CPC ...... F25B 47/022; F25B 41/22; F25B 49/022; F25B 2400/077; F16K 3/24
See application file for complete search history.

(56) References Cited

U.S. PATENT DOCUMENTS 5,070,707 A     12/1991  Ni
6,688,319 B2 *   2/2004  Trantham ............. G05D 7/0133
                                                            137/2
2017/0205127 A1  7/2017  Jia

FOREIGN PATENT DOCUMENTS

EP      0088648        9/1983
EP      0088648 B1 * 11/1988 ............... F16K 1/10
(Continued)

OTHER PUBLICATIONS

Timmermans, A double seal valve assuring an absolute leaktightness, 1982, Full Document (Year: 1982).*
(Continued)

*Primary Examiner* — Elizabeth J Martin
*Assistant Examiner* — Nael N Babaa
(74) *Attorney, Agent, or Firm* — Renner, Otto, Boisselle & Sklar, LLP

(57) ABSTRACT

A valve for a refrigeration system and a method of forming a valve includes a dual piston assembly having an inner piston (44) and an outer piston (42) that are moveable relative to each other to control pressure equalization flow through the valve, and an adjustable control stem (66) engageable with the outer piston that enables a low fluid equalization flow when in a first position and a variably higher fluid equalization flow when in a variable second position. The inner piston has a plurality of bleed orifices (46, 48) that are openable by movement of the outer piston relative to the inner piston.

18 Claims, 5 Drawing Sheets

(51) Int. Cl.
*F16K 3/24* (2006.01)
*F16K 3/32* (2006.01)
*F25B 49/02* (2006.01)
(52) U.S. Cl.
CPC ...... *F25B 49/022* (2013.01); *F25B 2400/077* (2013.01)

(56) References Cited

FOREIGN PATENT DOCUMENTS

| | | |
|---|---|---|
| EP | 0789174 | 8/1997 |
| EP | 3115668 | 1/2017 |
| WO | 88/04383 | 6/1988 |
| WO | 2017/021243 | 2/2017 |

OTHER PUBLICATIONS

International Search Report and Written Opinion for corresponding U.S. patent application No. US/PCT2018/066453 dated Mar. 21, 2019.

\* cited by examiner

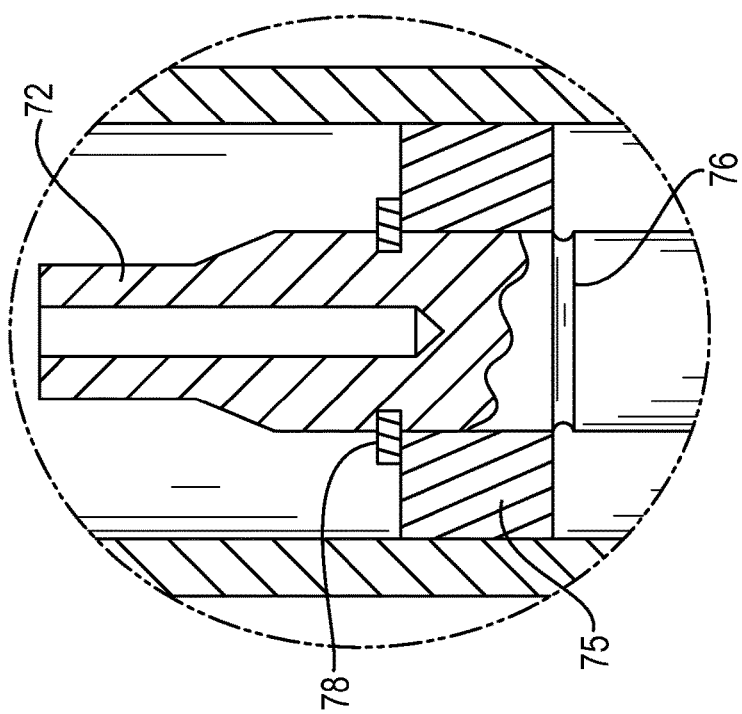
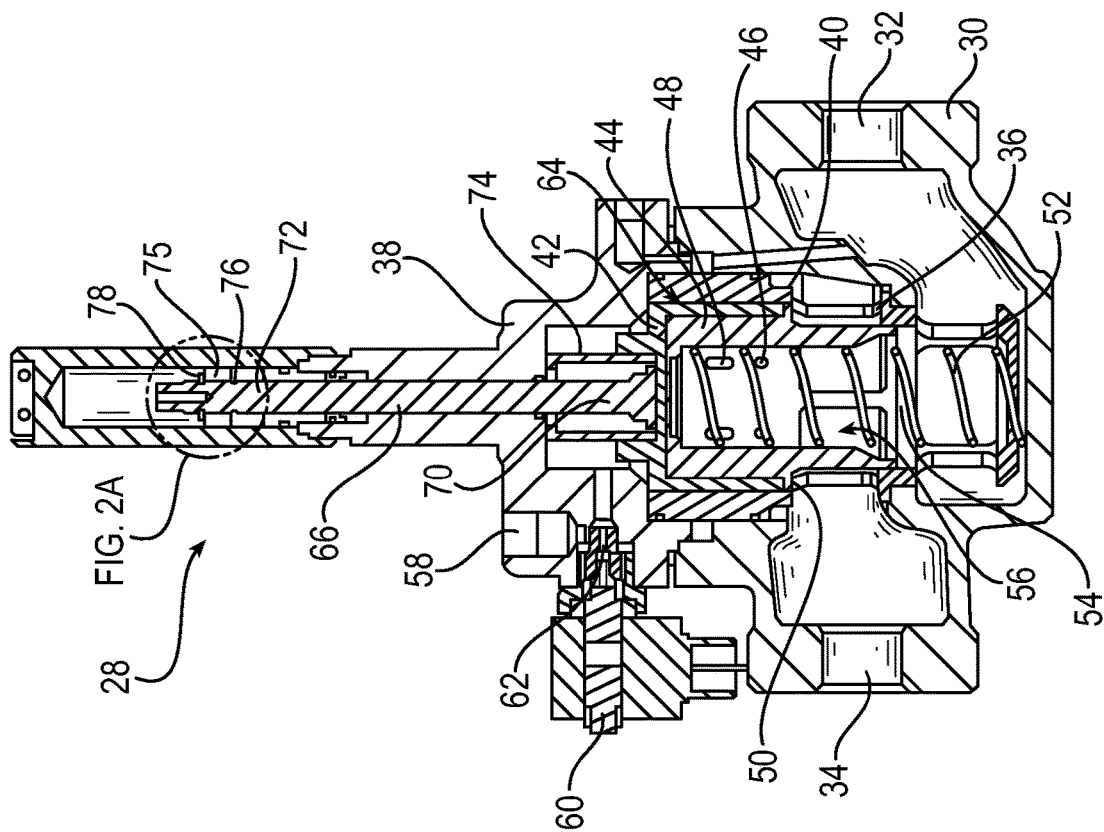

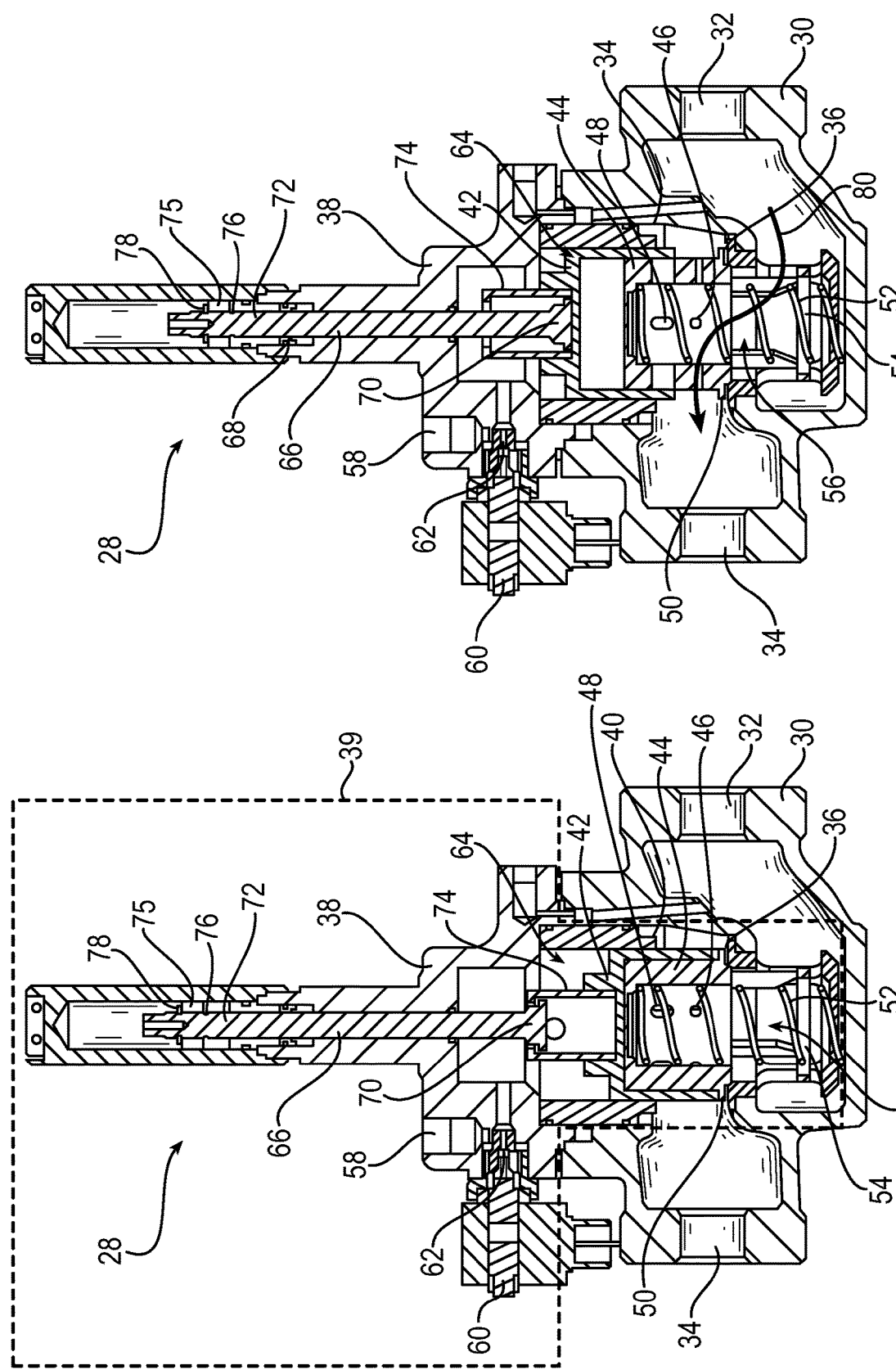

VALVE COMPRISING A DUAL PISTON ASSEMBLY AND METHOD OF FORMING A VALVE

This application is a national phase of International Application No. PCT/US18/66453 filed Dec. 19, 2018, which claims benefit of U.S. Provisional Application No. 62/672,183 filed on May 16, 2018, and published in the English language.

FIELD OF INVENTION

The present invention relates to refrigeration valves, and more particularly, to refrigeration valves used on compressor suction lines during a defrost cycle.

BACKGROUND

Refrigeration systems typically include a refrigerant which flows through a compressor which increases the pressure of the refrigerant, a condenser which condenses the refrigerant from a vapor form to a liquid form, an expansion valve for dropping the pressure, and an evaporator which absorbs heat and causes the refrigerant to vaporize. The compressor is configured to create a suction force that draws the refrigerant from the evaporator. During normal operation, the evaporator coils require defrosting. During the defrost cycle, the compressor suction being applied to the evaporator must be temporarily stopped.

Conventionally, valves have been used to stop the suction by arranging the valve to be normally open to flow without a pressure drop across the valve required to keep the valve open. The valves are then closed by controlling an external energy source such as the hot gas used for defrosting the evaporator coils. However, after the defrost cycle has been completed, conventional valves may be disadvantageous in failing to prevent the main suction from being re-applied to the evaporator too quickly. A quick re-application of suction in the system may consequently cause damage to system components.

Prior attempts to prevent the overly quick reassertion of suction have included providing valves that use replaceable orifices that enable the rate of pressure equalization across the valve to be adjusted. The replaceable orifices may be changed by opening the valve and modifying features inside the body of the valve. However, modifying the valve requires isolating the valve and opening the refrigerant flow path which is inefficient and may cause damage to system components.

SUMMARY OF INVENTION

The present invention is directed towards valves used in a refrigeration system, and more particularly to a valve that is arranged between an evaporator and a compressor of a refrigeration system. The valve is used to stop suction from the evaporator to the compressor during a defrost cycle of the evaporator and resume the suction after the defrost cycle is completed. The valve advantageously enables changing of a pressure equalization bleed rate of the valve, which allows the valve to resume full flow suction when a predetermined pressure differential across the valve is reached. Accordingly, the valve prevents opening the valve too quickly which otherwise may cause damage to the system components.

A dual piston assembly having an inner piston and an outer piston is arranged in the valve, and a control stem is arranged to limit movement of the outer piston. The inner piston and the outer piston are moveable for opening and closing the valve. The inner piston and the outer piston are also moveable relative to each other such that bleed orifices formed on the inner piston may be opened by movement of the outer piston away from the inner piston when the valve first moves toward an open position to enable flow across the valve.

At least one bleed orifice is formed on the inner piston. A plurality of bleed orifices may be formed on the inner piston. The control stem is positioned to either enable a low equalization flow across the valve during which a minimum pressure-equalization flow path is opened, or a pressure-equalization flow path of progressively increasing area until a maximum flow path is opened. A person operating the valve can quickly and easily adjust the rate of pressure-equalizing flow through the valve by changing the position of the control stem without modifying any additional components of the refrigeration system. Being able to externally adjust the rate of pressure-equalizing flow through the valve effectively enables optimization of the defrost cycle for the evaporator, resulting in less wear on the system components and improved overall system efficiency.

Additionally, the valve is advantageous in that the piston assembly and the control stem are arranged in a module assembly that is insertable into a valve body of the valve. The module assembly includes the valve seat, and the valve body includes the inlet and outlet of the valve. By arranging the piston assembly and the control stem in the module assembly, the components may be used with different valve bodies. For example, the module assembly may be removed from a first valve body and reused with another valve body. Thus, the valve body may be secured or welded into the refrigeration system and remain free of wear components.

Still another advantage of the valve is that an external visual indicator of the position of the control stem is provided. The control stem may include a plurality of grooves that are positioned relative to a stop ring on the control stem. Additionally, a set-point collar may be used to identify a set position of the control stem. The person operating the valve may thus easily see the position of the control stem and adjust the position for either a low equalization flow across the valve or a higher equalization flow, depending on the requirements of the application for the valve.

According to an aspect of the invention, a valve includes a valve body, a dual piston assembly having an inner piston and an outer piston that are moveable relative to each other to control pressure equalization flow through the valve body, and an adjustable control stem engageable with the outer piston that enables a low fluid equalization flow across the valve when in a first position and a progressively increasing fluid equalization flow across the valve when adjusted to a variable second position. The inner piston has a first set of bleed orifices and a second set of bleed orifices that are openable by movement of the outer piston relative to the inner piston. The first set of bleed orifices are open during the low fluid equalization flow, and the first set of bleed orifices and a variable portion of the second set of bleed orifices are open during the high fluid equalization flow.

According to another aspect of the invention, a method of forming a valve includes arranging a dual piston assembly having an inner piston and an outer piston that are moveable relative to each other to control pressure equalization flow through the valve body, arranging an adjustable control stem that is engageable with the outer piston and enables a low fluid equalization flow across the valve when in a first position and a high fluid equalization flow across the valve when in a second position, and forming a plurality of bleed orifices on the inner piston that are openable by movement of the outer piston relative to the inner piston.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 2 is a drawing showing a sectional view of the valve of FIG. 1 when in a normally open position.

FIG. 2A is a drawing showing a detailed sectional view of a portion of the valve of FIG. 2.

FIG. 3 is a drawing showing a sectional view of the valve of FIG. 1 when in a closed position.

FIG. 4 is a drawing showing a sectional view of the valve of FIG. 1 when in an initial opening position under high pressure differential conditions when set to the low equalization flow across the valve.

DETAILED DESCRIPTION

Figure 1:
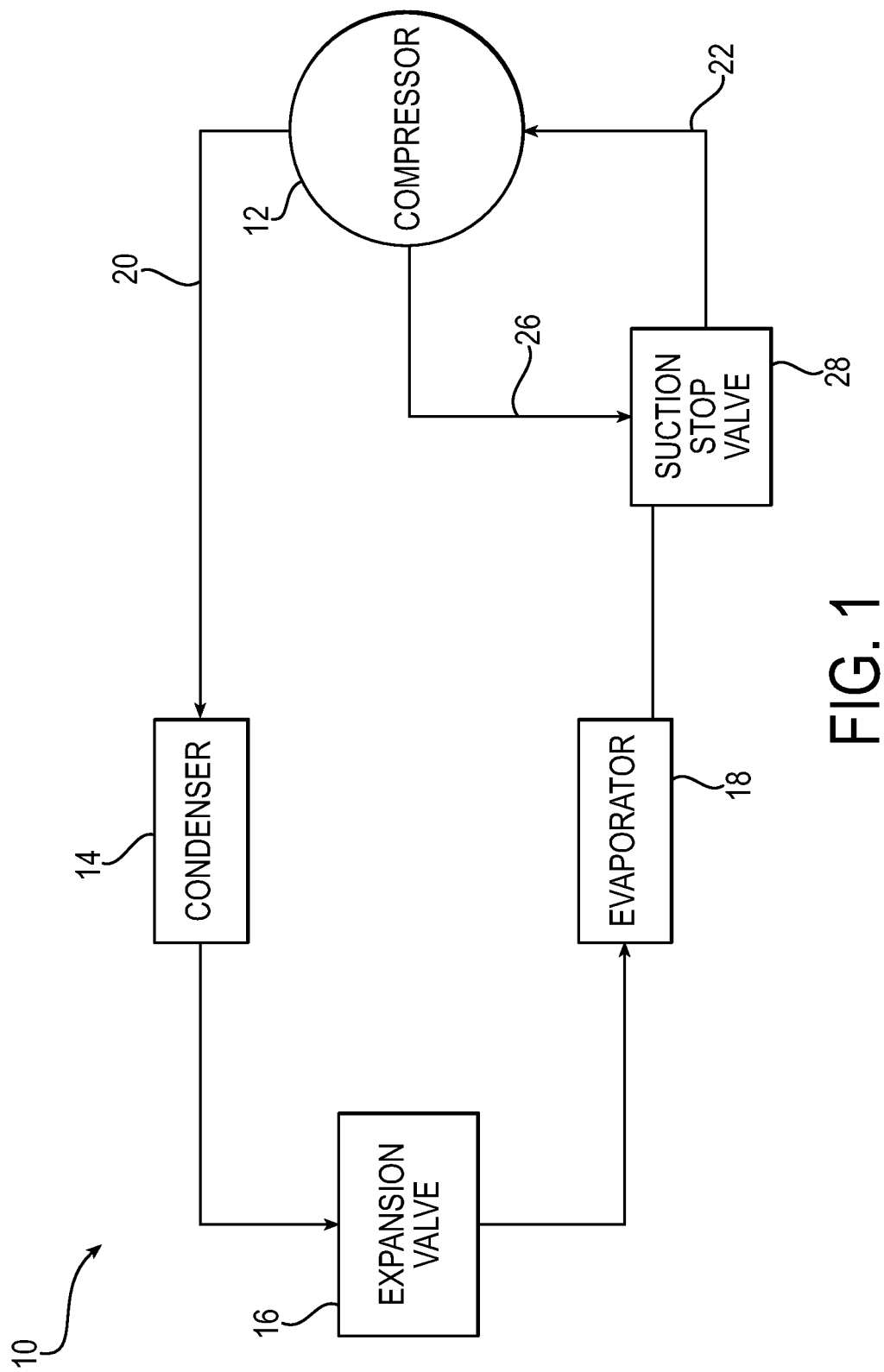
FIG. 1 is a schematic drawing showing a refrigerant fluid conduit loop that has a valve arranged between an evaporator and a compressor.

Aspects of the present invention relate to valves used in refrigeration systems, and particularly to a valve that is used to prevent refrigerant flow during a defrosting cycle of an evaporator in a refrigeration system. Referring first to FIG. 1, a schematic drawing of an exemplary refrigeration system 10 is shown. The refrigeration system 10 includes a compressor 12, a condenser 14, an expansion valve 16 and an evaporator 18 that are arranged along a refrigerant fluid conduit loop 20. During normal operation, fluid flows continuously along the refrigerant fluid conduit loop 20. The compressor 12 is configured to create a suction force that draws the refrigerant from the evaporator 18 along a suction line 22 during normal flow of the refrigerant through the refrigerant fluid conduit 20.

At predetermined periods during normal operation of the refrigeration system 10, the evaporator coils will undergo a defrosting cycle which can be performed using hot gas from the compressor 12. During the defrost cycle, the suction force along the suction line 22 is temporarily stopped using a valve 28 arranged along the suction line 22 between the compressor 12 and the evaporator 18. The valve 28 may be a suction stop valve. The valve 28 is also arranged to receive hot gas from the compressor 12 for operation of the valve 28. FIGS. 2-8 show different positions of the valve 28 during normal operation, the defrost cycle, and resuming normal operation after the defrost cycle has completed.

Referring first to FIGS. 2-3, FIG. 2 shows a full flow open position of the valve 28 and FIG. 3 shows a closed position of the valve 28. The valve 28 includes a valve body 30 having an inlet 32 and an outlet 34 that is in fluid communication with the inlet 32 through the valve body 30. The valve body 30 further includes a valve seat 36 that is arranged between the inlet 32 and the outlet 34 and openable and closeable for enabling fluid flow and preventing fluid flow through the valve 28. The valve 28 includes a bonnet 38 that is arranged for connection to the valve body 30. The bonnet 38 additionally receives all remaining components of the valve 28 forming a module assembly 39, as indicated in FIG. 3, that is securely connected to the valve body 30 when assembled, and also removable from the valve body 30. Thus, the valve body 30, which may be secured or welded into the refrigeration system 10, is advantageously free of wear components. The bonnet 38 is arranged on an open end of the valve body 30, and a valve cartridge 40 is secured to the bonnet 38 of the module assembly 39 using any suitable connection mechanism, such as a threaded connection.

The valve cartridge 40 houses and guides a piston assembly 42, 44 having an outer piston 42 and an inner piston 44 that are arranged in the module assembly 39. The outer piston 42 has an outer diameter that surrounds an outer diameter of the inner piston 44 such that the outer piston 42 may be in the form of a sleeve arranged over the inner piston 44. The inner piston 44 and the outer piston 42 are arranged concentrically along a longitudinal axis and are axially moveable relative to each other.

The inner piston 44 has a plurality of bleed orifices 46, 48 formed on the external surface of the inner piston 44 that enable fluid flowing through the suction valve 28 to pass therethrough. A first set of bleed orifices 46 is arranged at a lower portion of the inner piston 44, and a second set of bleed orifices 48 is arranged at an axially upper portion of the inner piston 44 such that the first set of bleed orifices 46 and the second set of bleed orifices 48 are axially spaced relative to each other. Any suitable number of bleed orifices 46, 48 may be provided. The second set of bleed orifices 48 are larger than the first set of bleed orifices 46. In an exemplary embodiment, the first set of bleed orifices 46 may be circular in shape and the second set of bleed orifices 48 may be elongated in the axial direction.

The sets of bleed orifices 46, 48 may be sequentially opened by movement of the outer piston 42 relative to the inner piston 44. When the outer piston 42 moves away from the inner piston 44, the first set of bleed orifices 46 may be first opened. As the outer piston 42 moves farther away from the inner piston 44, the second set of bleed orifices 48 may then be opened in addition to the first set of bleed orifices 46. Accordingly, when both sets of bleed orifices 46, 48 are open, a greater flow of fluid passes through the piston assembly 42, 44.

The outer piston 42 is arranged at an interface surface 50 of the inner piston 44, and a spring 52 is arranged at a second end or bottom end 54 of the inner piston 44. The spring 52 extends through an inner chamber 56 of the inner piston 44 and is engageable between a bottom portion of the valve cartridge 40 and the upper inner surface of the inner piston 44. The spring 52 is arranged to normally bias the valve 28 in an open position to provide a minimal pressure drop during normal operation, as shown in FIG. 2. The spring 52 exerts a force on the piston assembly 42, 44. When in the open position shown in FIG. 2, the valve 28 enables full fluid flow from the evaporator 18 through the valve 28 to the compressor 12 during normal operation of the refrigeration system 20, as shown in FIG. 1.

Operation of the valve 28 may be controlled through a hot gas port 58 arranged in the bonnet 38. The hot gas port 58 of the valve 28 is configured to receive pressurized gas from the discharge line 26 of the compressor 12, as shown in FIG. 1. The flow through the hot gas port 58 is controlled using any suitable actuation mechanism. For example, a solenoid 60 may be used and the solenoid 60 may be configured to open and close a corresponding valve 62 that is in fluid communication between the hot gas port 58 and a piston chamber 64 in which the piston assembly 42, 44 is moveable. The piston chamber 64 is also formed in the module assembly 39 and is arranged above the outer piston 42. The solenoid 60 may be energized to supply pressurized gas to the valve 28 and de-energized to cease supply of the pressurized gas.

A control stem 66 is arranged at an end of the module assembly 39 and extends through the module assembly 39 into the piston chamber 64. The control stem 66 is formed as a separate component from the module assembly 39 and is formed as an elongated body. The control stem 66 is at least partly housed in and securely connected to the bonnet 38 at a location above the piston assembly 42, 44. The control stem 66 may be threaded to the bonnet 38 and is sealed using a packing nut assembly 68 that is radially arranged between the control stem 66 and the bonnet 38. The control stem 66 has a first end 70 that is positioned within the piston chamber 64 for engagement by the outer piston 42 to prevent travel of the outer piston 42 past a predetermined position. A second end 72 of the control stem 66 that is opposite the first end 70 extends outwardly from the bonnet 38 and away from the piston assembly 42, 44. The control stem 66 may interface with a stem lift tube 74 that is part of the outer piston 42 and is arranged in the piston chamber 64. The stem lift tube 74 enables the outer piston 42 to be drawn open. Using the stem lift tube 74 enables the valve 28 to be manually set to ensure flow across the valve 28.

The position of the control stem 66 relative to the piston assembly 42, 44 is advantageously adjustable such that the control stem 66 may be externally adjusted to adapt the valve 28 for different system pressure-equalization flow rates without adjusting the other components in the valve 28. The position of the control stem 66 is fixed when assembled, but the control stem 66 may be moved axially toward and away from the piston assembly 42, 44. In an exemplary embodiment, the control stem 66 may be manually moved by an operator of the valve 28. In alternative embodiments, the control stem 66 may be automatically moved in response to the detection of changing system conditions using suitable position sensors and pressure sensors. The position of the control stem 66 determines whether only the first set of bleed orifices 46 formed on the inner piston 44 is to be opened when the outer piston 42 moves away from the inner piston 44, or both the first set of bleed orifices 46 and a variable portion of the second set of bleed orifices 48 are to be opened.

For example, when the valve is allowed to open while under high pressure differential conditions, low equalization flow through the first set of bleed orifices 46 is opened when the control stem 66 is arranged at a predetermined first distance relative to the piston assembly 42, 44, as shown in FIG. 4. If high equalization flow across the valve 28 is desirable, the control stem 66 is then adjusted to a second position in which the control stem 66 is arranged at a distance relative to the piston assembly 42, 44 that is greater than the first distance. The outer piston 42 then has a greater distance of travel relative to the inner piston 44 and moves further to open both sets of bleed orifices 46, 48.

The valve 28 may also include at least one external visual indicator such that the position of the control stem 66 is visually displayed to the valve operator. The valve 28 may also include a set-point collar 75, as best shown in FIG. 2A, for fixing the position of the control stem 66 after adjustment. The external visual indicator may be in the form of grooves 76 formed on the external surface of the control stem 66 and a stop ring 78 that is arranged at the second end 72 of the stem 66 that protrudes out of the module assembly 39. The stop ring 78 establishes the maximum inward position that the control stem 66 can be advanced to within the module assembly 39.

The set-point collar 75 may be formed as a separate component and arranged around the second end 72 of the control stem 66. The set-point collar 75 may be arranged to extend radially outwardly from the control stem 66. The set-point collar 75 may be in the form of a suitable fastener, such as a collar with a set screw that is tightened after the axial position of the control stem 66 is set. When secured, the set-point collar 75 is fastened against the control stem 66. Using the set-point collar 75 is advantageous for fixing the position of the control stem 66 after axially moving the control stem 66 into the suitable position for the proper equalization flow. The set-point collar 75 acts as an external position originating mechanism on the control stem 66, such that the set-point collar 75 allows for adjusting the control stem 66, for example, to manually ensure the valve open position, and returning the control stem 66 to the established control stem position.

The operation of the valve 28 will now be described with respect to the different positions of the valve 28 shown in FIGS. 2-8. The normally open position is shown in FIG. 2. When in the normally open position, the spring 52 pushes on the piston assembly 42, 44. The spring 52 extends through the inner chamber 56 of the inner piston 44 and against the upper inner surface of the inner piston 44 to bias the inner piston 44 away from the cartridge base 36 and against the outer piston 42. Accordingly, full fluid flow occurs through the valve 28 from the inlet 32 to the outlet 34 for fluid flow from the evaporator 18 to the compressor 12 (as shown in FIG. 1). When the valve 28 is in the normally open position, the outer piston 42 is engageable against the control stem 66. The refrigerant pressure drop across the valve 28 is minimized and refrigerant continuously flows through the refrigerant conduit loop 20. Forming the valve 28 to be a normally open valve is advantageous in that little or no energy is required to maintain the valve 28 in the open position.

When the defrost cycle for the evaporator 18 is actuated, the normal fluid flow through the valve 28 is stopped and the valve 28 will move from the normally open position of FIG. 2 to the closed position of FIG. 3. The fluid flow is stopped by energizing the solenoid 60 which opens the valve 62 to enable hot gas from the compressor 12 to flow from the hot gas port 58 to the piston chamber 64 to the top side of the outer piston 42. In an exemplary embodiment, the pressurized gas may provide a pressure of around 150 pounds per square inch (PSI). The pressurized gas generates a force on the outer piston 42 to overcome the force of the spring 52. The outer piston 42 is forced away from the control stem 66 and acts against the interface surface 50 of the inner piston 44 to force the inner piston 44 to compress the spring 52.

When the inner piston 44 reaches the stop at the valve seat 36, the valve 28 is in the closed position such that fluid does not flow through the valve 28 and the suction line 22 (as shown in FIG. 1). The defrost cycle for the evaporator 18 may then be performed using the hot gas from the compressor 12.

When the defrost cycle for the evaporator 18 is completed, suction in the suction line 22 is resumed by opening the stop valve 28, such that the stop valve 28 will move from the closed position shown in FIG. 3 to the initial opening position shown in FIG. 4. The valve 28 is advantageous in that the valve 28 is prevented from quickly opening to enable full flow through the valve 28 due to the initial high pressure difference across the valve 28. Opening the valve 28 too quickly to resume the suction flow between the evaporator 18 and the compressor 12 may cause damage and wear to the system components, such as the evaporator 18.

Opening the stop valve 28 is actuated by de-energizing the solenoid 60 to stop the flow of pressurized gas through the hot gas port 58. If the pressure difference across the valve 28 is greater than a predetermined value, such as 15 psi, the inner piston 44 will remain in the closed position. The outer piston 42 will move away from the inner piston 44 to engage against the first end 70 of the control stem 66. When the inner piston 44 remains in the closed position and the outer piston 42 moves away from the inner piston 44, the first set of bleed orifices 46 formed in the side of the inner piston 44 is exposed to flow. The second set of bleed orifices 48 remains closed to flow. Thus, fluid flowing through the valve 28 initially passes only through the first set of bleed orifices 46 of the inner piston 44. Accordingly, a low equalization flow of fluid 80 is generated across the valve 28 when the valve 28 is in the initial opening position shown in FIG. 4.

The valve 28 will remain in the initial opening position of FIG. 4 until the pressure differential across the valve 28 decreases to the predetermined value. When the pressure differential reaches the predetermined value, the valve 28 will then move from the initial opening position shown in FIG. 4 to the full flow open position shown in FIG. 5. When the pressure differential has decreased, the closing force exerted on the inner piston 44 due to pressure will decrease such that the force of the spring 52 will bias the inner piston 44 toward the outer piston 42 such that the interface surface 50 of the inner piston 44 will engage against the outer piston 42 which is engaged against the control stem 66. Accordingly, the control stem 66 prevents any further movement of the piston assembly and a full flow of fluid 82 occurs across the valve 28.

Figure 6:
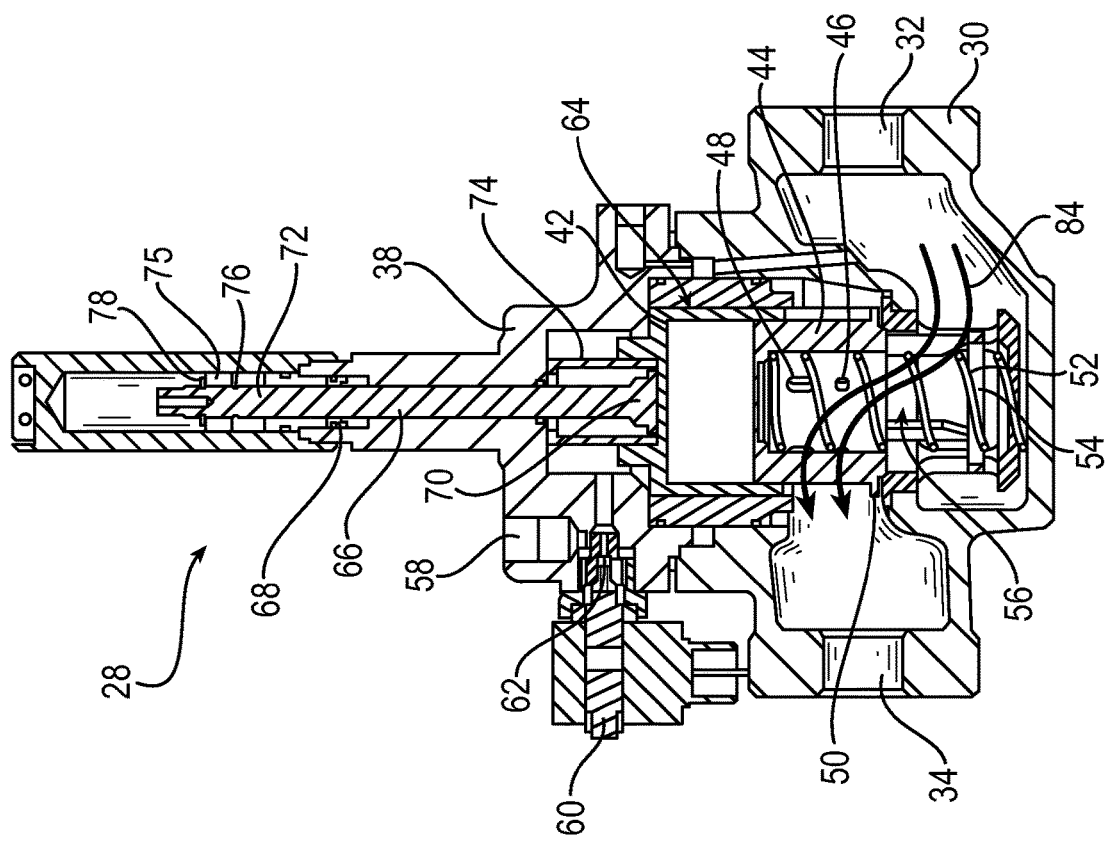
FIG. 6 is a drawing showing a sectional view of the valve of FIG. 1 when in an initial opening position under high pressure differential conditions when set to the high equalization flow across the valve.

The rate of flow through the valve 28 when in the initial opening position shown in FIG. 4 may be increased by adjusting the position of the control stem 66 to the position shown in FIG. 6. The control stem 66 may be arranged farther outwardly relative to the piston assembly 42, 44 such that the outer piston 42 travels farther away from the inner piston 44 to engage against the control stem 66 when the valve 28 moves to the initial opening position. As shown in FIG. 6, by enabling the outer piston 42 to move to a position that is farther away from the inner piston 44 relative to the initial opening position shown in FIG. 4, both of the first set of bleed orifices 46 and a variable portion of the second set of bleed orifices 48 formed on the inner piston 44 are opened such that fluid flow through the valve 28 passes through both sets of bleed orifices 46, 48 to enable a progressively higher equalization flow of fluid 84 through the valve 28 as compared with the low equalization flow of fluid of FIG. 4.

Figure 5:
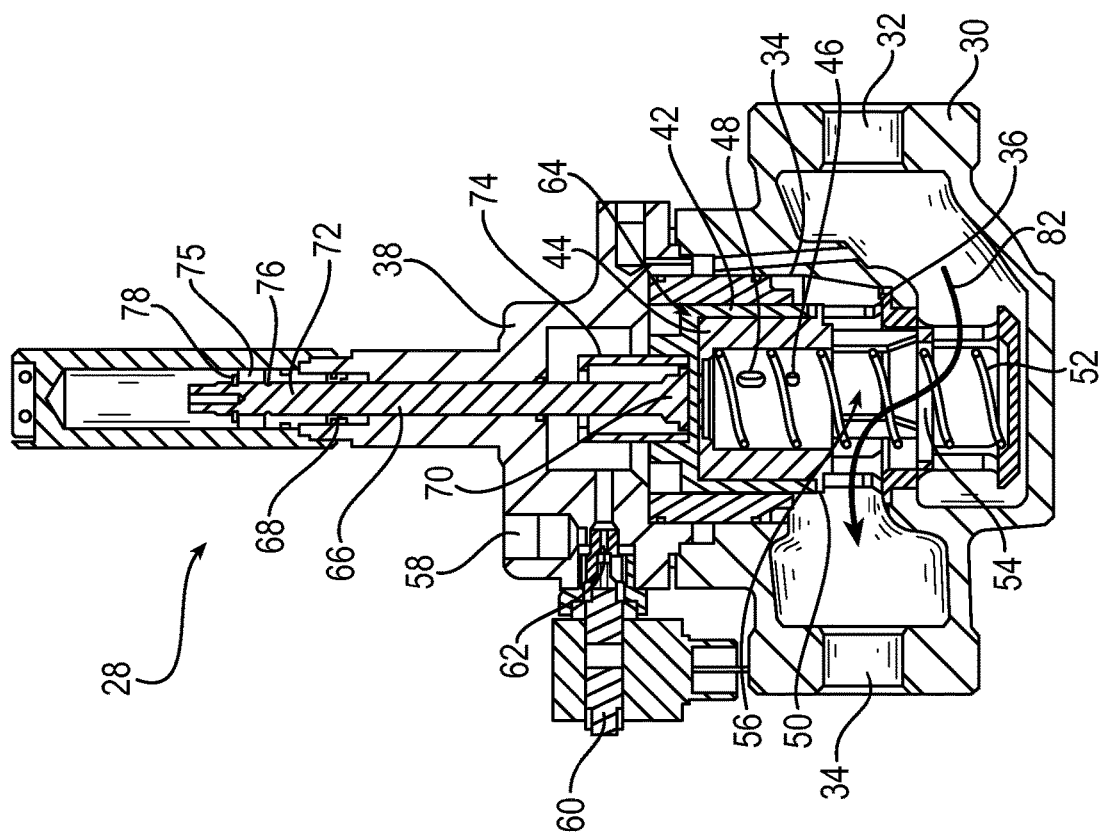
FIG. 5 is a drawing showing a sectional view of the valve of FIG. 1 when the valve is under lower pressure differential conditions and is in a full flow open position after moving from the initial opening position of FIG. 4 to the full flow open position.
Figure 8:
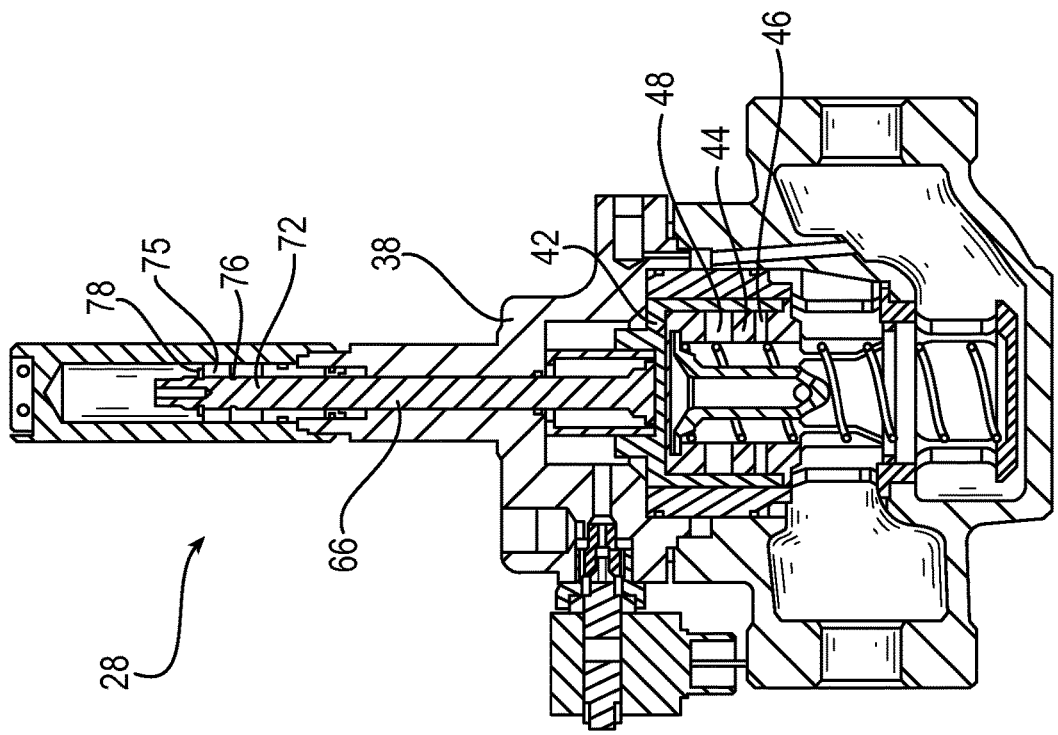
FIG. 8 is a drawing showing another sectional view of the valve of FIG. 1.
Figure 7:
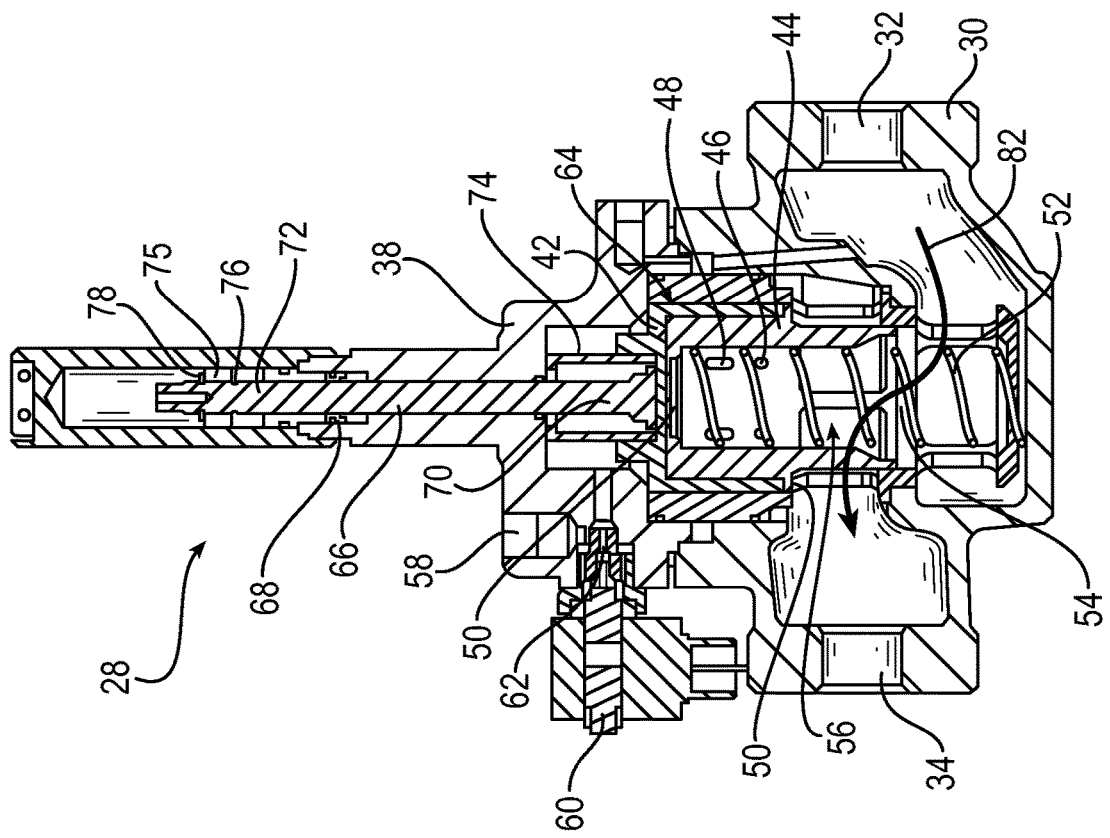
FIG. 7 is a drawing showing a sectional view of the valve of FIG. 1 when the valve is under lower pressure differential conditions and is in a full flow open position after moving from the initial opening position of FIG. 6 to the full flow open position.

When the pressure difference across the valve 28 reaches the predetermined value, such as 15 psi, the valve 28 will move to the full flow open position shown in FIG. 7, which is similar to the full flow open position shown in FIG. 5. The closing force acting against the inner piston 44 due to pressure will decrease enabling the force of the spring 52 to bias the inner piston 44 away from the closed position and against the outer piston 42 which is engaged against the control stem 66. Accordingly, the full flow of fluid 82 will occur through the valve 28. Using the control stem 66 is advantageous in that the rate of flow through the inner piston 44 may be varied between the small flow rate, as shown in FIG. 4, and the higher flow rate, as shown in FIG. 6, by adjusting the position of the control stem 66 without adjusting additional components of the valve 28. The operation of the valve 28 may thus be quickly and easily tuned externally by the valve operator for optimization of the defrost cycle in the refrigeration circuit.

A valve includes a dual piston assembly having an inner piston and an outer piston that are moveable relative to each other to control flow through the valve, and an adjustable control stem engageable with the outer piston that enables an adjustable reduced flow rate when the valve is opened under high pressure differentials. The inner piston has a first set of bleed orifices and a second set of bleed orifices that are openable by movement of the outer piston relative to the inner piston. The first set of bleed orifices are open during the low fluid equalization flow, and the first set of bleed orifices and a variable portion of the second set of bleed orifices are open during the higher fluid equalization flow.

The second set of bleed orifices may be larger than the first set of bleed orifices.

The valve may include a piston chamber and a pressurized gas port in fluid communication with the piston chamber.

The valve may include a solenoid that actuates the pressurized gas port.

The valve may include a biasing device that engages the inner piston to bias the valve in a position open to flow.

The valve may include a removable module assembly, wherein the dual piston assembly and the adjustable control stem may be arranged in the module assembly and removable relative to a valve body of the valve.

The valve may include a valve cartridge that houses the inner piston and the outer piston, and is connected to the module assembly.

The valve may include a biasing device that is engageable between the valve cartridge and the inner piston.

The control stem may be threaded to a bonnet of the module assembly, and the valve cartridge may be threaded to the bonnet.

The valve may include a packing nut assembly that seals the control stem relative to the bonnet.

The valve may include at least one visual indicator formed on the control stem that corresponds to a position of the control stem. The visual indicator may be externally visible outside of the valve.

The at least one visual indicator may include at least one of a plurality of grooves formed on the control stem and a stop ring that surrounds an end of the control stem.

The valve may include an adjustable member that is configured to establish at least one predetermined position for the control stem.

The control stem may interface with a stem lift tube arranged adjacent to the outer piston that draws the outer piston open.

A method of forming a valve includes arranging a dual piston assembly having an inner piston and an outer piston that are moveable relative to each other to control pressure equalization flow through the valve during periods of high pressure differential, arranging an adjustable control stem to be engageable with the outer piston and enable a low fluid equalization flow across the valve when in a first position and a higher fluid equalization flow across the valve when in a second position, and forming a plurality of bleed orifices on the inner piston that are openable by movement of the outer piston relative to the inner piston.

Forming the plurality of bleed orifices may include forming a first set of bleed orifices and a second set of bleed orifices. The first set of bleed orifices may be opened during the low fluid equalization flow, and the first set of bleed orifices and a variable portion of the second set of bleed orifices may be opened during the high fluid equalization flow.

The method may include arranging the adjustable control stem at a first distance relative to the dual piston assembly to enable the low fluid equalization flow, and arranging the adjustable control stem at a second distance relative to the dual piston assembly that is variably greater than the first distance to enable the variably higher fluid equalization flow.

The method may include arranging the dual piston assembly and the control stem in a module assembly and removably attaching the module assembly to a valve body of the valve.

The method may include providing an external visual indicator on the control stem that is externally verifiable to determine whether the control stem is in the first position or in a second position.

The method may include providing an external position originating mechanism on the control stem, adjusting the control stem, and returning the control stem to a predetermined control stem position using the external position originating mechanism after the control stem is adjusted.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
   a dual piston assembly having an inner piston and an outer piston that are moveable relative to each other to control pressure equalization flow through the valve; and
   an adjustable control stem engageable with the outer piston whereby the valve is opened with a pressure differential and a fluid equalization flow across the valve when in a first position and a progressively increasing fluid equalization flow across the valve when adjusted to a variable second position,
   wherein the inner piston has a plurality of bleed orifices that are openable by movement of the outer piston relative to the inner piston,
   wherein the plurality of bleed orifices includes a first set of bleed orifices and a second set of bleed orifices that are openable by movement of the outer piston relative to the inner piston, the first set of bleed orifices being open during the fluid equalization flow, and the first set of bleed orifices and a variable portion of the second set of bleed orifices being open during the progressively increasing fluid equalization flow.

2. The valve according to claim 1, wherein the second set of bleed orifices are larger than the first set of bleed orifices.

3. The valve according to claim 1 further comprising a piston chamber and a pressurized gas port in fluid communication with the piston chamber.

4. The valve according to claim 3 further comprising a solenoid that actuates the pressurized gas port.

5. The valve according to claim 1 further comprising a spring that engages the inner piston to bias the valve in an open position.

6. The valve according to claim 1 further comprising a removable module assembly that has a bonnet, wherein the dual piston assembly and the adjustable control stem are arranged in the removable module assembly and removable relative to a valve body of the valve.

7. The valve according to claim 6 further comprising a valve cartridge that houses the inner piston and the outer piston, wherein the valve cartridge is connected to the bonnet of the removable module assembly.

8. The valve according to claim 7 further comprising a spring that is engageable between the valve cartridge and the inner piston.

9. The valve according to claim 7, wherein the adjustable control stem is threaded to the bonnet of the removable module assembly, and the valve cartridge is threaded to the bonnet.

10. The valve according to claim 6 further comprising a packing nut assembly that seals the adjustable control stem relative to the bonnet of the removable module assembly.

11. The valve according to claim 1 further comprising at least one visual indicator formed on the adjustable control stem that corresponds to a position of the adjustable control stem, wherein the visual indicator is externally visible outside of the valve.

12. The valve according to claim 11, wherein the at least one visual indicator includes at least one of a plurality of grooves formed on the adjustable control stem and a stop ring that surrounds an end of the adjustable control stem.

13. The valve according to claim 1, wherein the adjustable control stem includes a stem lift tube arranged adjacent the outer piston that draws the outer piston open.

14. A method of forming a valve, the method comprising:
    arranging a dual piston assembly having an inner piston and an outer piston that are moveable relative to each other to control pressure equalization flow through the valve;
    arranging an adjustable control stem to be engageable with the outer piston, whereby the valve is opened with a pressure differential and a fluid equalization flow across the valve when in a first position and a variably higher fluid equalization flow relative to the fluid equalization flow across the valve when in a second position; and
    forming a plurality of bleed orifices on the inner piston that are openable by movement of the outer piston relative to the inner piston, wherein forming the plurality of bleed orifices includes forming a first set of bleed orifices and a second set of bleed orifices, wherein the first set of bleed orifices are opened during the fluid equalization flow, and the first set of bleed orifices and a variable portion of the second set of bleed orifices are opened during the variably higher fluid equalization flow.

15. The method according to claim 14 further comprising:
arranging the adjustable control stem at a first distance relative to the dual piston assembly to enable the fluid equalization flow; and
arranging the adjustable control stem at a second distance relative to the dual piston assembly that is variably greater than the first distance to enable the variably higher fluid equalization flow.

16. The method according to claim 14 further comprising arranging the dual piston assembly and the adjustable control stem in a module assembly and removably attaching the module assembly to a valve body of the valve.

17. The method according to claim 14 further comprising providing an external visual indicator on the adjustable control stem that is externally verifiable to determine whether the adjustable control stem is in the first position or in the second position.

18. The method according to claim 14 further comprising providing an external position originating mechanism on the adjustable control stem that allows for returning the adjustable control stem to a predetermined control stem position using the external position originating mechanism after the adjustable control stem is adjusted.

\* \* \* \* \*